United States Patent [19]
Schwarz
[11] Patent Number: 4,639,147
[45] Date of Patent: Jan. 27, 1987

[54] FRICTION PIVOT ASSEMBLY

[76] Inventor: Edward L. Schwarz, 2825 Brookwood Terr., Minneapolis, Minn. 55410

[21] Appl. No.: 639,802
[22] Filed: Aug. 13, 1984
[51] Int. Cl.[4] ..................... E05C 17/64; A47K 13/12; B63H 25/00; F16C 11/04
[52] U.S. Cl. ..................................... 384/125; 4/236; 4/240; 16/340; 16/342; 16/DIG. 33; 114/144 R; 384/264; 403/158; 403/227
[58] Field of Search ......... 16/340, 342, 382, DIG. 33; 403/158, 227; 188/381, 130; 4/236, 240; 384/125, 220, 222, 264; 114/144 R

[56] References Cited

U.S. PATENT DOCUMENTS

| | | | |
|---|---|---|---|
| 1,721,288 | 7/1929 | Thiry | 16/DIG. 33 X |
| 1,956,040 | 4/1934 | Meyer | 16/340 |
| 2,390,168 | 12/1945 | Piot | 403/227 |
| 2,533,186 | 12/1950 | Bricker et al. | 403/158 |
| 2,846,697 | 8/1958 | Phillips | 4/240 |
| 4,428,094 | 1/1984 | Emain | 16/342 X |

*Primary Examiner*—Stuart S. Levy
*Assistant Examiner*—David Werner
*Attorney, Agent, or Firm*—Edward Schwarz

[57] ABSTRACT

A pivot assembly has a substantial amount of inherent frictional torque. A shaft has a clearance space between itself and a wall of its journal hole. A pliable tubular bushing is axially compressed within the shaft clearance space to create rotational friction between the shaft and the bearing journal. Such an assembly has diverse applications in areas such as the swivel for sailboat tiller extensions, toilet seat lid hinges, and hinged covers for electronic cabinets or other equipment.

23 Claims, 5 Drawing Figures

FRICTION PIVOT ASSEMBLY

BACKGROUND OF THE INVENTION

Certain devices common in our society employ hinged elements which ideally should maintain the rotational position in which they are manually placed. To make this idea more concrete, consider a hinged cover for a record turntable. It should reliably maintain its open position without being so held when the record is being changed, and then be easily lowered to its closed position. Or consider the ubiquitous hinged toilet seat cover: what male in our society hasn't had a toilet seat's bottom ring flop down at the most inopportune time, creating an unpleasant untidiness. In a more esoteric situation, the extension of a sailboat tiller which allows the skipper to steer the craft while sitting to windward should maintain its position while the skipper momentarily releases it to make mainsheet adjustment or do some other activity with his or her steering hand.

Heretofore this rotational friction has not been simply, cheaply and reliably available. Special linkages, say employing a dashpot, are expensive and complicated. Compressing a resilient washer between the elements rotating with respect to each other with a nut and bolt arrangement results in washers which frequently deteriorate and whose frictional torque is difficult to accurately adjust. The toilet seat's environment requires a simple mechanism whose exterior is easily cleaned, resistant to corrosion, and very durable.

In other situations it is desirable to provide a friction pivot wherein the frictional torque created can be adjusted to compensate for the weight of a hinged cover for example, for personal preference in the case of a sailboat tiller extension, or for wear.

PRIOR ART STATEMENT

The reference considered to most similar to the invention to be described is U.S. Pat. No. 2,533,186 (Bricker et al.) which discloses bushings which are axially compressed by the assembly of which they form a part to prevent the shafts passing through them from fitting loosely in their journals and rattling under use. The disclosed apparatus is directed to disc brake assemblies. Also in the brake field is the less similar assembly disclosed in U.S. Pat. No. 3,152, 846 (Dumpis). U.S. Pat. Nos. 2,542,967 (Waechter); 2,520,375 (Roe); and 1,953,636 (Skelton) all disclose compressed rubber bushings which create axial, i.e. translational friction.

BRIEF DESCRIPTION OF THE INVENTION

A pivot which simply and inexpensively provides reliable rotational friction comprises a journal member having a hole of preselected diameter and length in it. A bracket has rigidly attached to it a cylindrical shaft member having at its free end a first portion projecting through the journal member hole and a second portion integral with the remainder of the bracket. ("Axial" hereafter means axial with respect to this shaft.) The shaft is rotatable with respect to the journal member and has a diameter within the hole establishing an annular clearance space between itself and the wall of the journal member hole.

A tubular friction bushing formed of a pliable material and having an outside diameter substantially that of the journal member hole diameter and an inside diameter substantially that of the shaft member within the hole, occupies at least a portion of the annular clearance space and encircles the shaft. Adjacent each end of the friction bushing are stop means axially shiftable relatively toward each other. Compressing means are operatively linked to the shiftable stop means for axially shifting at least one stop means toward the other, thereby compressing the friction bushing between the stop means within the annular clearance space. This causes the friction bushing to radially press against the journal member wall and the shaft surface adjacent creating rotational friction between the journal member and the bracket.

In most cases, one stop means will be a shoulder or collar carried on either the bracket or adjacent one end of the journal member hole, and at least partially blocking the hole. A rigid sleeve slidable on the shaft and having a diameter allowing it to at least partially enter and block the annular clearance space between the journal member hole and the bracket may comprise another stop means. Compressing means in this embodiment may comprise threads on the first portion of the shaft adjacent and projecting from the hole and the sleeve and a nut tightened onto these threads which urge the sleeve toward the shoulder or collar, axially compressing the friction bushing between them.

There are several other equivalent variations. For example, the shaft may have a shoulder adjacent its second portion of a diameter which can enter and block the annular clearance space adjacent one end of the friction bushing and the journal member may have a collar encircling the first portion of the shaft and blocking the annular clearance space adjacent the other end of the friction bushing. Assuming the bracket and the journal member are axially shiftable toward each other any sort of bushing or compressing means urging the collar toward the shoulder will cause the required axial compression of the friction bushing to create the rotational friction. This may comprise a spring, or a nut threaded onto the end of the shaft projecting from the journal member hole.

There are certain applications for which this pivot is particularly well suited. All involve relatively low rotational speed and low radial load. In sailboats having a tiller and tiller extension, such a pivot between these elements will allow the helmsperson to release the tiller extention from his or her grasp without the tiller extension under influence of gravity due to leeward heel of the hull, rotating toward the leeward side and away from the helmsperson. Electronic equipment covers are frequently hinged at the back to allow access by the user, and yet provide a dust shield essentially all the time. Such a pivot as described may hinge the cover to the cabinet cheaply and reliably allowing the cover to be lifted into an upright position which it will then conveniently maintain until the user lowers it into position after completing access to the equipment.

Toilet seat lids, particularly when decorative fabric covers are placed on them, are notorious for falling down at inopportune times. The pivot described can be easily adapted to be a toilet seat lid hinge which will hold toilet seat lids in their upright position regardless of the presence of fabric covers.

Accordingly, one purpose of this invention is to provide a pivot joint capable of providing rotational friction in a wide range of applications.

Another purpose is to allow easy adjustment of such a pivot for a wide range of rotational frictions.

Yet another purpose is to provide a pivot whose rotational friction will maintain a relatively constant level over an extended period of use.

A last purposė is to provide such a pivot using only a few inexpensive materials for most applications.

DETAILED DESCRIPTION OF THE PREFERRED EMBODIMENTS

Figure 1:
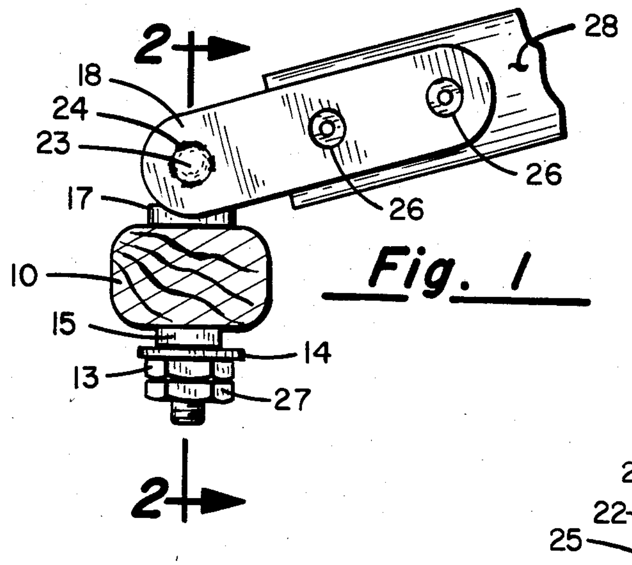
FIG. 1 is a view of a tiller and its extension incorporating one embodiment of the invention.
Figure 2:
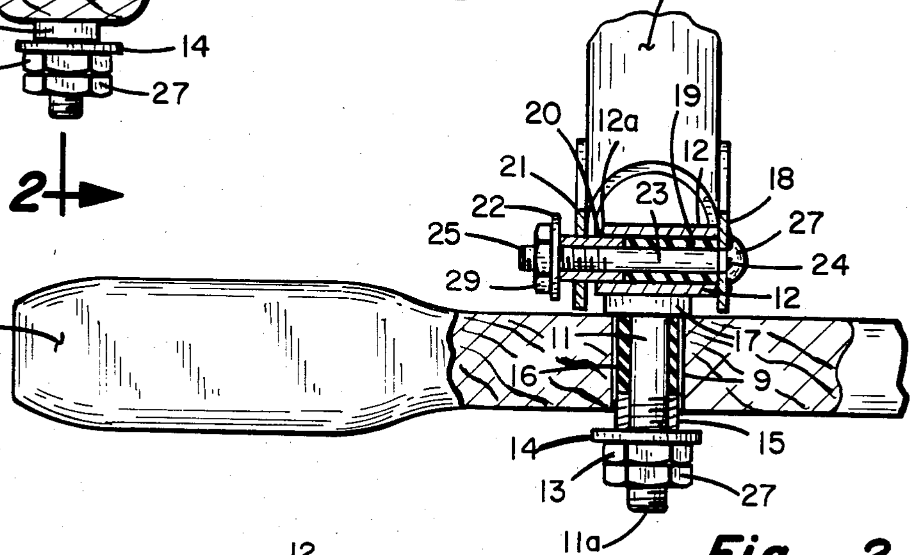
FIG. 2 is a section view of the pivot of FIG. 1.
Figure 3:
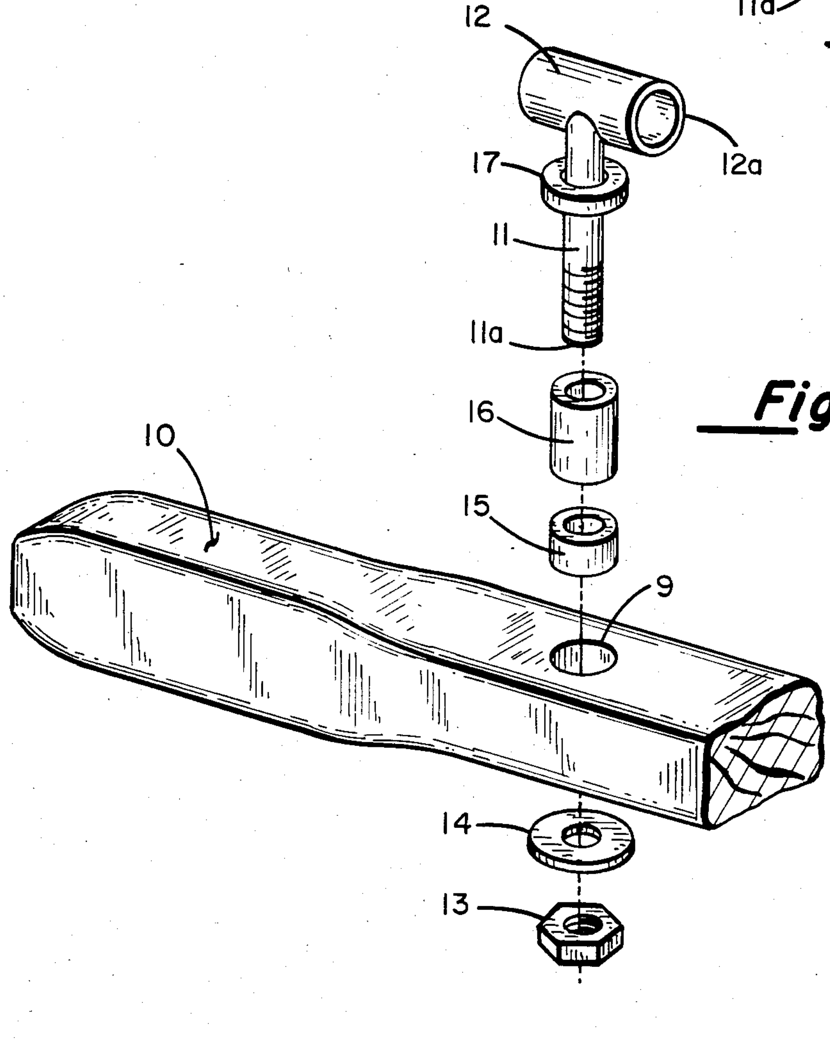
FIG. 3 is an exploded perspective view of a portion of the pivot shown in FIGS. 1 and 2.

Turning first to consider FIGS. 1–3 simultaneously, tiller 10 and tiller extenstion 28 (adjacent the tiller's handle) are joined by two pivots of the type forming the subject of this invention, and which provide universal joint action for the extension 28 with respect to the tiller 10. This is useful when swinging the extension 28 from one to the other side of the boat during tacks and jibes. Considering the individual elements of each pivot shown in FIGS. 1–3, a bracket 12 (comprising in part a rigid tube 12*a*) includes a shaft 11 threaded along at least a part of a first portion 11*a* comprising the shaft 11 length near its free end. Shaft 11 also has a second portion adjacent the end where shaft 11 is rigidly attached as by welding to tube 12*a* to form the structure of bracket 12. Tube 12*a* has a hole passing through itself at right angles to the axis of shaft 11.

Shaft 11 itself is fitted through a hole 9 in tiller 10 adjacent its handle, said hole having a diameter sufficiently larger than shaft 11's diameter to establish an annular clearance space between them. A pliable tubular friction bushing 16 whose outside diameter is substantially that of the hole 9 (FIG. 3) in tiller 10 and whose inside diameter is the same or slightly larger than shaft 11's diameter, occupies a portion of this annular clearance space. A first stop means comprises a washer-shaped bushing or shoulder 17 carried on and if desired integral with shaft 11 and interposed between tiller 10 and tube 12*a* and axially restrained by tube 12*a*. A second stop means formed by a rigid tube or annular sleeve 15 having substantially the radial dimensions of the friction bushing 16 is carried on shaft 11 adjacent its first portion and occupies the annular clearance space so as to abut the adjacent end of friction bushing 16. Nut 13 is turned onto the threads carried on the shafts first end 11*a*, with a washer type bushing 14 interposed between it and sleeve to help ease friction between nut 13 and sleeve 15. Nut 27 locks nut 13 in place. Alternatively, nut 13 may have a locking insert which resists any tendency to loosen. Friction bushing 16 can be made of any of several soft, pliable materials such as polyethylene or soft rubber which have relatively high coefficients of friction on metal or plastic and which are conveniently available as tubing easily cut to the required length.

Nut 13 is turned firmly onto shaft 11 so as to axially compress friction bushing 16 between sleeve 15 and shoulder 17. This creates rotational friction on torque between bushing 16 and the adjacent walls of hole 9 and shaft 11. This frictional torque is carried from the wall of the hole in handle 10 to shaft 11 creating rotational friction between shaft 11 and handle 10.

Because of the greater radius of hole 9 relative to shaft 11 diameter, friction bushing 16 remains fixed relative to handle 10 when shaft 11 is rotated. Because pliable materials such as that contemplated for use as friction bushing have little volumetric compressibility, axial compression of such a bushing 16 radially expands it creating relatively high contact pressure between the bushing 16 on the one hand, and the wall of hole 9 and surface of shaft 11 on the other. Further, such materials have substantial resistance to permanent shear deformation such that substantial amounts of frictional torque are created in such a pivot. The amount of frictional torque or rotational friction depends on the coefficient of friction between shaft 11 and friction bushing 16, the amount of axial force generated by nut 13, and the diameter of shaft 11.

A preferred set of elements for such a pivot for use with a tiller for a small sailboat is a 5/16" diameter shaft 11, a ¾" long friction bushing 16 having 5/16" and 7/16" inside and outside diameters respectively, and a ⅜" long rigid annular sleeve 15 having the same radial dimensions as friction bushing 16. Tiller 10 itself should have a hole 9 of 29/64" diameter into which the pivot assembly fits. However, the length of bushing 16 is not critical, and most conveniently should be slightly shorter than the length of hole 9. Rigid sleeve 15 length is also not critical but should be long enough to allow friction bushing 16 to be axially compressed at least 15–25% of its length. Therefore, it is convenient to choose sleeve 15 to have a length about one-half that of friction bushing 16 so as to provide suitable adjustment of the frictional torque created. The length of the threads carried on shaft first portion 11*a* should also accomodate such adjustments.

Such a pivot can create upwards of a pound foot of friction torque with nut 13 screwed down tightly, more than enough to keep a tiller extension in the position placed by the skipper regardless of the craft's heel. Furthermore, by adjustment of nut 13, the frictional torque can be adjusted over a relatively wide range to suit individual skippers' preference. Because of the structure, no backlash or slop is present in the pivot, which is a welcome characteristic.

As compared to a friction pivot which uses a threaded bolt to squeeze rubber washers between the tiller and its extension to provide the friction, the amount of frictional torque provided by the instant invention is much less sensitive to the rotational position of the clamping nut. Suitable frictional torque is generated over a range of one or even more revolutions of nut 13. A corrolary of this characteristic is that such a pivot assembly tends to maintain frictional torque within a desired range without the need for further adjustment of nut 13 for relatively long periods of use.

It should be noted that the order in which the elements are carried on shaft 11 is immaterial. For example the positions of rigid sleeve 15 bushing and shoulder 17 may be interchanged. Sleeve 15, if positioned adjacent tube 12*a* may be integral with shaft 11. In fact, one less part is required with such a design, which may be advantageous when manufacturing in large quantities.

FIGS. 1 and 2 show further a second pivot similar to that just described, employing a shaft 23 rotatably mounted within a journal comprising rigid tube 12*a*. Tube 12*a* as explained earlier is rigidly fastened adjacent washer 17 to the end of shaft 11 with axes orthogonal, thereby forming a rigid bracket assembly 12 which can rotate about a vertical axis (as shown) relative to tiller 10. Shaft 23's pivot assembly in conjunction with shaft 11's pivot assembly together form a universal joint connecting tiller extension 28 with tiller 10 and having substantial rotational friction about each axis allowing extension 28 to maintain any selected angular orientation relative to tiller 10 in which it is manually placed.

Tiller extension 28 comprises a rigid tube to which rivets 26 fasten brackets 18 and 21, bracket 18 being shown in side view in FIG. 1 and in end view with bracket 21 in FIG. 2. Shaft 23 is rigidly attached to form a part of bracket 18, for example by a weldment 24. Shaft 23 may comprise a bolt whose head provides a suitably large surface for welding to the bracket 18. As with the pivot assembly of which shaft 11 forms a part, shaft 23 fits within the hole in tube 12*a* and establishes an annular clearance space between itself and the wall of the hole. A part of this annular clearance space is occupied by a resilient friction bushing 19 which functions as does friction bushing 16. A rigid annular sleeve 20 whose inside diameter is substantially that of the shaft 23 diameter and whose outside diameter is the same as or slightly less than the diameter of the hole in tube 12*a* encircles shaft 23 adjacent friction bushing 19 within the hole in tube 12*a*. Rigid sleeve 20 also projects through an appropriately sized hole at the end of bracket 21 towards a threaded end 25 of shaft 23. A nut 29 which may have a locking insert, is threaded onto the threaded end 25 of shaft 23, with a washer 22 interposed between it and sleeve 20. The washer 22 tends to ease friction between nut 29 and sleeve 20 so that nut 29 does not tend to loosen.

As with the pivot assembly of which shaft 11 forms a part, nut 29 can be screwed firmly down onto threads 25 to increase rotational friction between shaft 23 and the tube 12*a*, allowing tiller extension 28 to maintain any particular angular orientation desired with respect to the horizontal. The amount of rotational friction can be adjusted to compensate for wear and for a skipper's preference by tightening or loosening nut 29.

In assembling the pivot assembly incorporating shaft 23 either bracket 18 or 21 must be free of extension 28 when shaft 23 is installed in the hole in tube 12*a*. After installation has been done, then the loose bracket 18 or 21 can be riveted permanently to extension 28 using blind set rivets 26 and bushings 19 and 20 slipped onto the end of shaft 23 and pressed through the annular clearance space into the position shown in FIG. 1. If one should desire to remove friction bushing 19 at some later time, either bracket 18 or 21 must usually be removed from extension 28, since bushing 19 tends to permanently mold its shape against the wall of the hole in journal 12 preventing its being drawn out. If by some chance use becomes so extreme that bushing 19 must be replaced frequently, then brackets 18 and/or 21 can conveniently be bolted to extension 28 in place of riveting.

Note that pivots such as described here have very little radial play, a constant source of annoyance to a skipper who is steering with the tiller extension. An experimental friction bushing 16 has displayed great durability under relatively hard use on a 20 foot racing scow.

Figure 4:
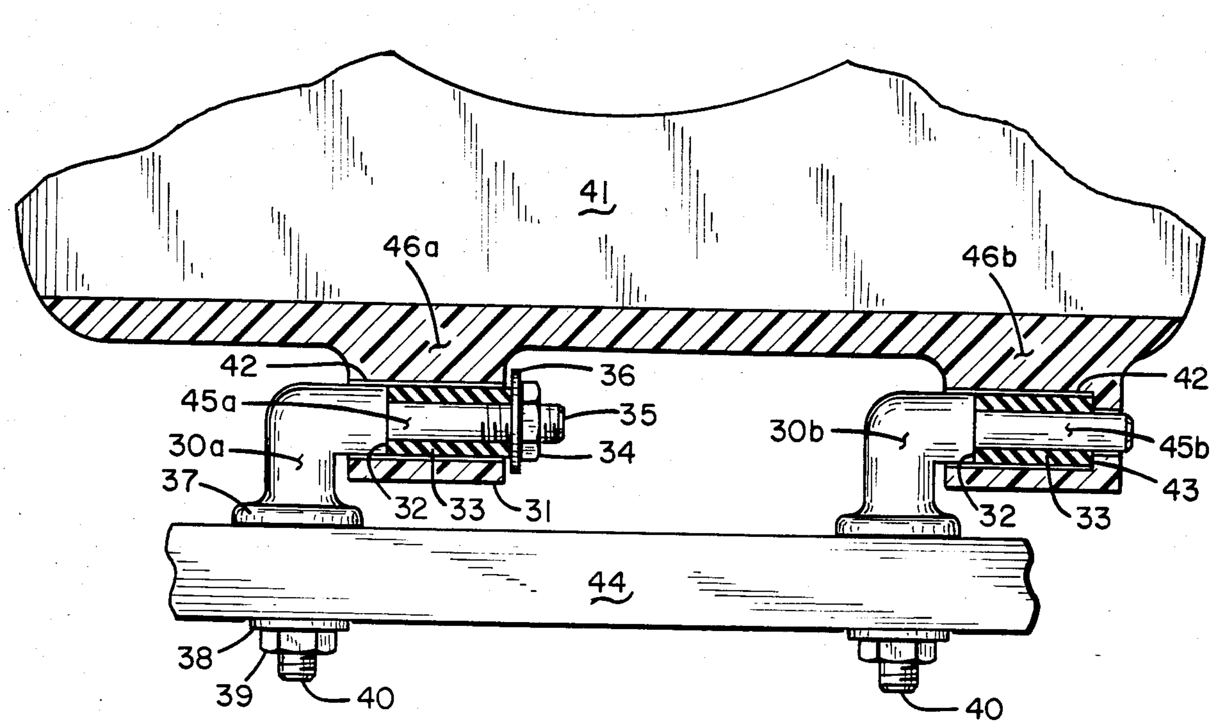
FIG. 4 is a partial section view of a second embodiment of the invention adapted for use as a toilet seat lid hinge.

The pivot assembly design shown in FIGS. 1–3 can be easily adapted to other applications. FIG. 4 shows a structural variant of the design of FIGS. 1–3 applied to a toilet bowl lid to keep it from inconveniently falling down. Such a lid 41 has a hinge projections 46*a* and 46*b* each carrying round journal holes 42 in concentric relationship and spaced to be adjacent the seat anchor holes of the toilet fixture 44 itself. Brackets 30*a* and 30*b* are fastened into these anchor holes with washers 38 for load distribution and nuts 39 on threaded anchor shafts 40. Brackets 30*a* and 30*b* include concentric pivot shafts 45*a* and 45*b* rigidly fixed at right angles to the anchor shafts 40. Each pivot shaft 45*a* or 45*b* includes a shoulder 32 adjacent the body of the corresponding bracket 30*a* or 30*b*, which shoulder 32 functions as a second stop means. The end of the pivot shaft 45*a* has threads 35 to receive a nut 34 with washer bushing 36 interposed between itself and hinge projection 46*a* which functions as a first stop means.

Each shaft 45*a* and 45*b* projects into and through its corresponding journal hole 42 in the lid 41, the diameters of the portions of brackets 30*a* and 30*b* adjacent shafts 45*a* and 45*b* defining shoulders 32 being very slightly smaller than the matching part of corresponding journal hole 42.

The remainder of each pivot shaft 45*a* or 45*b* establishes an annular clearance space between the wall of the associated hole 41 and itself along at least part of its length. Hole 42 in projection 46*b* has a reduced diameter formed by an integral shoulder 43 occupying at least a portion of the aforementioned clearance space adjacent the end of the hole 42 as well as adjacent the end of the shaft 45*b* to function as a first stop means. On the other hand, a different structure comprising nut 35 (with washer 36 interposed) functions as a first stop means defining one end of the annular clearance space surrounding shaft 45*a*. Of course, a shoulder integral with hinge projection 46*a* may occupy the annular clearance space adjacent washer 36 in place of friction bushing 33 extending to washer 36. In any case the length of each friction bushing 33 is preferrably approximately equal. The clearance space surrounding each pivot shaft 45*a* or 45*b* thus is defined by a pair of cylindrical walls facing each other and the facing shoulders 32 and 43 or shoulder 32 and washer 36.

Each of these annular clearance spaces is substantially filled by a pliable friction bushing 33 whose inside diameter may be equal to or a little greater than the diameter of the shaft 45*a* or 45*b* adjacent, whose outside diameter may be equal to or a little less than the inside diameter of the hole 42 adjacent, and whose length should be at least equal to about its outside diameter and preferrably more. Each shoulder 32 should project sufficiently into its hole 42 to establish clearance between its associated anchor or bracket 30*a* or 30*b* and the left side of the associated hinge projection 46*a* or 46*b* so as to allow the adjacent friction bushing 33 to be axially compressed to whatever extent desired. As with the tiller extension's friction bushing 16, the bushings 33 may be formed of any of several different pliable materials such as rubber, polyethylene, etc. Preferrably the spacing between shoulders 32 approximately equals that between the left face of washer 36 and shoulder 43, insuring that the lengths of the bushings 33 can be approximately equal. Thus each can be axially compressed the same amount by tightening nut 34 so that each provides approximately the same amount of frictional torque regardless of the axial compression.

The pivots of FIG. 4 are assembled as shown therein with nut 34 turned onto threads 35. By tightening nut 34 both bushings 33 are compressed, creating frictional torque between shafts 45*a* and 45*b*, and the adjacent journal hole 42 wall. By adjusting the force generated by nut 34, any weight of toilet seat cover can be mounted on its support brackets to 30*a* and 30*b* so as to remain in its upright position regardless of the presence of a fabric cover causing it to slant forward away from the flush box and slightly past its balance point. By judiciously choosing the length of bushings 33 and position of brackets 46*a* and 46*b* on lid 41, the lid 41 can be centered over the toilet bowl itself.

Figure 5:
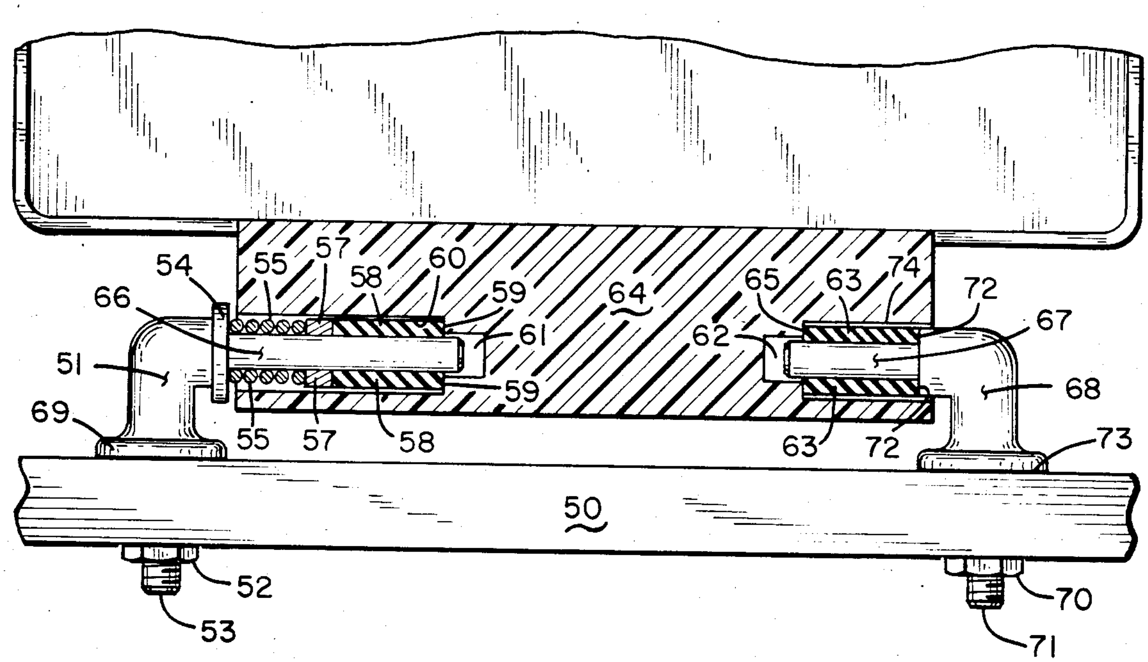
FIG. 5 is a partial section view of a third embodiment of the invention adapted for use as an electronic equipment cover hinge.

Yet another structural variant of the design of FIGS. 1-3 is shown in FIG. 5, in this case adapted for an equipment lid 64. Brackets 51 and 68 are fastened to an equipment deck 50 by threaded anchor shafts 53 and 71 which fit through anchor holes in deck 50. Nuts 52 and 70 turned onto shafts 53 and 71 clamp the associated bracket 51 or 68 and flange 69 or 73 rigidly to deck 50. Alternatively, one of brackets 51 and 68 may be molded into deck 50. (Both cannot be molded into deck 50 because it is necessary to assemble the two hinges, as will be explained.)

The left hand hinge, including bracket 51, has a shaft 66 journaled within journal hole 60 of lid 64 between which an annular clearance space is established. This clearance space is occupied in part by a shoulder 59 integral with lid 64 and adjacent a first portion of shaft 66. Hole 60 has also a clearance space 61 at the end of shaft 66. Adjacent shoulder 59 the pliable tubular friction bushing 58 through which shaft 66 passes occupies a part of the annular clearance space. A rigid tubular sleeve 57 through which shaft 66 also passes occupies a further part of the annular clearance space adjacent friction bushing 58 so that bushing 58 is between rigid sleeve 57 and shoulder 59. A compressing means comprising a relatively powerful compression coil spring 55 through which shaft 66 passes is interposed between sleeve 57 and a flange 54 integral with bracket 51 adjacent a second portion of shaft 66 where it (shaft 66) attached to bracket 51.

Turning to the right hand hinge including bracket 68, a shaft 67 concentric with shaft 66 is journaled within hole 74 of lid 64, and between which too an annular clearance space is established. Hole 74 should be concentric with hole 60. Adjacent a first portion of shaft 67, a shoulder 65 integral with lid 64 forms a first stop means of this annular clearance space. Hole 74 has also a clearance space 62 at the end of shaft 67. A second shoulder 72 integral with bracket 68 occupies the annular clearance space adjacent the second portion of shaft 67 where it attaches to bracket 68. Interposed between shoulders 65 and 72 is a round, pliable tubular friction bushing 63 through the center hole of which shaft 67 passes.

In use, spring 55 presses sleeve 57 against resilient friction bushing 58. Shoulder 59 stops bushing 58 from axial movement causing it to expand against both shaft 66 and the wall of hole 60 causing frictional torque to be created between bracket 51 and lid 64. Shoulder 59 has its axial position maintained by the force generated by shoulder 65 pressing against bushing 63 and bushing 63's pressing against shoulder 72. Shoulder 72 is of course firmly anchored through bracket 68 in deck 50. The force between shoulders 65 and 72 also causes friction bushing 63 to expand creating additional frictional torque or rotational friction which acts on lid 64. Clearance spaces 61 and 62 allow the full force of spring 55 to be ultimately applied to friction bushings 58 and 63 so that maximum frictional torque for a given spring force can be developed. It can be seen that assembly of these hinge units requires that one or the other (or possible even both) of brackets 51 and 68 be detached from deck 50 so that the internal elements can be inserted and spring 55 compressed to align shafts 53 and 71 with their mounting holes.

The use of a spring 55 to provide axial force on friction bushings 58 and 63 allows long term use without appreciable reduction in the frictional torque generated by them, since spring 55 merely expands slightly to compensate for wear.

No doubt other variants of this invention, all employing a tubular pliable friction bushing on which axial force creates frictional torque between a journal and a shaft, can be devised. In particular, certain elements can be reversed or made integral with others without affecting the principles on which this pivot operates.

What I claim is:

1. A rotational friction pivot comprising:

(a) a journal member having a hole within it of preselected diameter and length;

(b) a bracket including a cylindrical shaft having a first portion projecting at least a predetermined distance into the hole, and a second portion integral with the remainder of the bracket, said shaft and journal member being relatively rotatable with respect to each other and said shaft having a diameter within the hole establishing an annular clearance space between itself and the wall of the journal member hole;

(c) a tubular friction bushing having first and second ends and formed of a pliable material, and having undeformed outside and inside diameters substantially that of the journal hole diameter and the shaft diameter respectively, and occupying a portion of the annular clearance space, said first and second ends of the friction bushing being adjacent the first and second portions of the shaft respectively;

(d) first and second stop means each at least partially disposed about the shaft adjacent the first and second ends of the friction bushing, at least one of said stop means occupying a part of the annular clearance space and slidably shiftable toward the other stop means within the annular clearance space; and (e) compressing means operatively linked to the shiftable stop means for axially shifting said shiftable stop means relatively toward the other stop means and axially compressing the friction bushing within the annular clearance space, whereby the friction bushing radially expands against the journal member hole wall and the shaft surface adjacent to allow rotation with frictional slipping between the bushing and at least one of the journal member and the bracket.

2. The pivot assembly of claim 1, wherein the second stop means comprises a shoulder on the bracket at least partially blocking the annular clearance space adjacent the second end of the friction bushing.

3. The pivot assembly of claim 2, wherein the shaft projects past the journal member and wherein the first stop means comprises a nut and wherein the compressing means comprise threads on the end of the shaft, said nut being threaded onto the shaft's threads and axially compressing the friction bushing between itself and the shoulder, and wherein the shoulder projects into the journal member hole and is slidable with respect thereto.

4. The pivot of claim 3, wherein the shoulder is integral with the bracket.

5. The pivot of claim 4 adapted for use to rotatably connect a sailboat tiller extension to a sailboat tiller and wherein the tiller comprises the journal member.

6. The pivot of claim 2, wherein the shoulder is integral with the bracket.

7. The pivot of claim 6, wherein the first stop means comprises a rigid sleeve slidable with respect to and encircling the shaft and projecting into the annular clearance space, and wherein the compressing means comprise in combination threads on the first portion of the shaft and a nut threaded onto the threads and axially pressing the sleeve against the friction bushing.

8. The pivot of claim 7 adapted for use to rotatably connect a sailboat tiller extension to a sailboat tiller and wherein the tiller comprises the journal member.

9. The pivot of claim 2, wherein the first stop means comprises a rigid annular sleeve integral with the journal member.

10. The pivot of claim 2, wherein the first stop means comprises an annular sleeve slidably encircling the shaft's first portion and past which the shaft projects, and wherein the compressing means comprises in combination threads on the projecting portion of the shaft and a nut threaded onto the shaft's threads urging the annular sleeve toward the shoulder, and compressing the friction bushing axially between them.

11. The pivot of claim 10, wherein the bracket includes a projection suitable for bolting through the toilet seat hole in a toilet bowl and the journal member comprises a portion of a toilet seat.

12. The pivot of claim 10, wherein the bracket forms a portion of an equipment housing, and the journal member comprises a portion of a cover for said housing.

13. The pivot of claim 1, wherein the second stops means comprises a shoulder on the shaft adjacent to the second portion and axially fixed thereto; wherein the first stop means comprises a rigid sleeve carried on the shaft and slidable thereon adjacent the first end of the shaft and with outside diameter suitable for at least partially occupying the annular clearance space between the hole and the shaft, and projecting from the hole; wherein the shaft projects from the sleeve; and wherein the compressing means comprises in combination threads on the shaft portion projecting from the sleeve, and a nut threaded onto the shaft's threads adjacent the sleeve, for compressing the friction bushing axially between the sleeve and the shoulder.

14. The pivot of claim 13, wherein the shoulder outside diameter is greater than the diameter of the hole in the journal member.

15. The pivot of claim 14 adapted for use to rotatably connect a sailboat tiller extenstion to a sailboat tiller, and wherein the tiller comprises the journal member.

16. The pivot of claim 1, wherein the first stop means comprises a shoulder axially fixed on the interior of the journal member hole and occupying at least a portion of the annular space surrounding the end of the shaft adjacent the shaft's first portion and wherein the second stop means comprises a rigid sleeve carried on the shaft adjacent the second end occupying at least a portion of the annular space adjacent the second end of the shaft; and wherein the compressing means comprises in combination sleeve biasing means carried on the second end of the shaft for axially urging the sleeve against the friction bushing, and pivot means for resisting axial movement of the journal member relative to the bracket and permitting journal member rotation relative to the bracket about the shaft's axis, whereby the cooperation of the sleeve biasing means and the pivot means causes the friction bushing to create the radial pressure between the friction bushing, and the journal member hole wall and the shaft surface.

17. The pivot of claim 16, wherein the sleeve biasing means comprise a compression coil spring pressing the sleeve against the friction member.

18. The pivot of claim 17, wherein the journal member comprises a portion of an equipment cover.

19. The pivot of claim 16, wherein the journal member comprises a portion of a toilet seat.

20. The pivot assembly of claim 16, wherein the outside diameter of the friction bushing is at least equal to its length.

21. The pivot assembly of claim 1, wherein the outside diameter of the friction bushing is at least equal to its length.

22. In a method of using a pivot assembly comprising:

(a) a journal member having a hole within it of preselected diameter and length;

(b) a bracket including a cylindrical shaft having a first portion projecting at least a predetermined distance into the hole, and a second portion integral with the remainder of the bracket, said shaft rotatable with respect to the journal member and having a diameter within the hole establishing an annular clearance space between itself and the wall of the journal member hole;

(c) a tubular friction bushing having first and second ends and formed of a pliable material, and having undeformed outside and inside diameters substantially that of the journal hole diameter and the shaft diameter respectively, and occupying a portion of the annular clearance space, said first and second ends of the friction bushing being adjacent the first and second portions of the shaft respectively;

(d) first and second stop means each at least partially disposed about the shaft adjacent the first and second ends of the friction bushing, at least one of said stop means occupying a part of the annular clearance space and slidably shiftable toward the other stop means within the annular clearance space; and (e) compressing means operatively linked to the shiftable stop means for axially shifting said shiftable stop means relatively toward the other stop means and axially compressing the friction bushing within the annular clearance space, the step of adjusting the compressing means to cause the shiftable stop means to axially shift relatively toward the other stop means and cause the friction bushing to radially expand and press against the shaft and journal member hole-surfaces adjacent and allow rotation with a predetermined amount of rotational friction between the bushing and at least one of the shaft and the journal member hole wall.

23. The pivot of claim 1 wherein the compressing means further comprises adjustment means for adjusting the axial position of the shiftable stop means, whereby the amount of frictional torque may adjusted.

* * * * *